United States Patent
Hsieh et al.

(10) Patent No.: US 9,054,779 B2
(45) Date of Patent: Jun. 9, 2015

(54) RADIO FREQUENCY INTERFERENCE SHIELD

(75) Inventors: Chang-Cheng Hsieh, Taipei (TW); Leo Joseph Gerten, Taipei (TW); Hung-Wen Cheng, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 481 days.

(21) Appl. No.: 13/616,712

(22) Filed: Sep. 14, 2012

(65) Prior Publication Data

US 2014/0079042 A1    Mar. 20, 2014

(51) Int. Cl.
| | |
|---|---|
| *H05K 9/00* | (2006.01) |
| *H04B 1/38* | (2006.01) |
| *H04B 1/26* | (2006.01) |

(52) U.S. Cl.
CPC .................................. *H04B 1/38* (2013.01)

(58) Field of Classification Search
CPC ... H05K 9/009; H05K 9/0018; H05K 9/0039; G06F 1/182
USPC ........ 455/300, 301, 575.5; 361/800, 816, 818
See application file for complete search history.

(56) References Cited

U.S. PATENT DOCUMENTS

| | | | |
|---|---|---|---|
| 5,373,101 A * | 12/1994 | Barabolak ..................... | 174/363 |
| 7,889,139 B2 | 2/2011 | Hobson et al. | |
| 7,933,123 B2 | 4/2011 | Wang et al. | |
| 2005/0250383 A1 * | 11/2005 | Bourgeas et al. ............. | 439/581 |
| 2009/0122507 A1 * | 5/2009 | Snider ............................ | 361/818 |
| 2011/0261551 A1 | 10/2011 | Chirla et al. | |
| 2012/0087065 A1 | 4/2012 | Kim et al. | |

OTHER PUBLICATIONS

Lin, H-N, Analysis of Platform Noise Effect on Performance of Wireless Communication Devices, (Research Paper), pp. 177-226. Mar. 2012.*

* cited by examiner

*Primary Examiner* — Lee Nguyen
(74) *Attorney, Agent, or Firm* — Hewlett-Packard Patent Development

(57) ABSTRACT

Examples provide various systems and method associated with intercepting radio frequency interference. In various examples, a wireless integrated circuit module comprises radio frequency connectors. An RF interference shield covers the RF connectors to intercept and ground interference.

20 Claims, 6 Drawing Sheets

RADIO FREQUENCY INTERFERENCE SHIELD

BACKGROUND

Computing devices, such as desktop computers, notebook computers, tablets, mobile phones, smartphones, and others may utilize communication systems, such as wireless local area network (WLAN) modules, to send and receive data. These computing devices are continually being reduced in size while their functionality is being increased. This increase in functionality and decrease in size leads to more components being housed within smaller enclosures. Various ones of these components, for example main antennas, auxiliary antennas, radio frequency (RF) components, power amplifiers, oscillators, and/or switches, among others, may generate and/or receive conductive energy and create interferences for other components.

DETAILED DESCRIPTION

Computing devices, such as but not limited to, desktop computers, notebook computers, tablets, slates, mobile phones, smartphones may include components that enable communication over multiple networks. For example, a computing device may include cellular communication components to enable the transfer and receipt of data over cellular networks in addition to other network components to enable the transfer and receipt of data over local area networks, both wireless and wired as examples.

These components, among others, may generate electromagnetic (EM) interference, which may also be referred to as radio frequency (RF) interference. Interference, EM or RF, is a disturbance that affects an electrical circuit due to either electromagnetic conduction or electromagnetic radiation emitted from a source. The interference may interrupt, degrade, or limit a performance of other components. In the case of a computing device, the effectiveness of an antenna and its corresponding chain of components may be affected or compromised due to interference generated by components internal or external to the computing device.

In one example, a computing device may include a wireless local area network (WLAN) module to transmit and receive data via a wireless local area network. In addition, the computing device may include wireless wide area network (WWAN) module to transmit and receive data via a wide area network. The WLAN module may utilize technologies based on, for example, IEEE 802.1x standards, while the WWAN module may utilize technologies based on LTE, UMTS, CDMA2000, GSM, among others. In one example, the WLAN module may generate RF interference that affects the WWAN module. The RF interference generated by the WLAN module may manifest as a harmonic within a frequency band operated in by the WWAN module.

In the present disclosure, various systems, methods, and apparatus are discussed that may enable receipt and grounding of interference generated by various components within a computing device. The disclosure will be discussed in the context of RF interference generated via a WLAN module, however, the disclosure is not so limited. For example, the teachings of the present disclosure while described with reference to intercepting and grounding interference generated by the WLAN module may also be applied to interference generated by other components both external and internal to the computing device.

Figure 1:
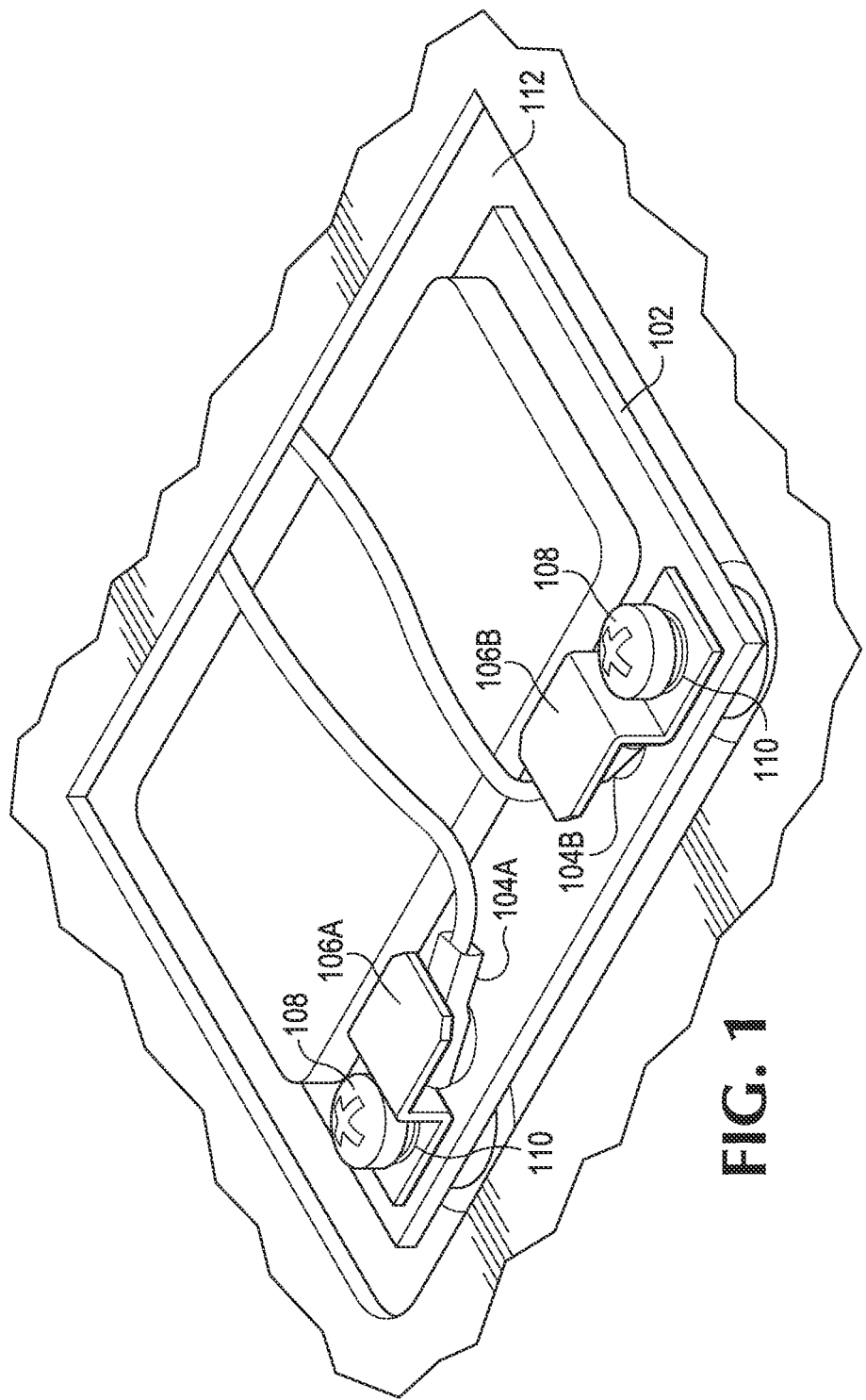
FIG. 1 illustrates a system in accordance with an example of the present disclosure.

Referring to FIG. 1, a system is shown in accordance with an example of the present disclosure. The system may be a computing device as mentioned previously. In the illustrated example, the system includes a wireless integrated circuit module 102, a fastener 108 to couple the wireless integrated circuit module 102 to a printed circuit board (PCB) 112, and an RF interference shield 106A-B coupled to the PCB 112 via the fastener 108. The RF interference shield 106A-B is to intercept and ground interference.

In various examples, the wireless integrated circuit module 102 may be wireless local area network (WLAN) device(s) configured to enable communication with devices located on the WLAN and across other networks. In other examples the wireless integrated circuit module 102 may be a module configured to enable wireless communication with other devices across other networks utilizing various protocols. The wireless integrated circuit module 102, as illustrated, includes one or more RF connectors 104A-B. The RF connectors 104A-B are electrical connectors configured to work at radio frequencies in the multi-megahertz range and upward. The RF connectors 104A-B may include standard connectors (BNC, BNA, C, etc.), miniature connectors (miniature BNC, miniature UHF, etc.) micro-miniature (IMP, MMT, etc.), or sub-miniature (MCX, SMA, SMB, SMC, etc.). In various examples, the RF connectors 104A-B may couple the wireless integrated circuit module 102 to other components, such as but not limited to, a main antenna, an auxiliary antenna, or other network interface components.

The wireless integrated circuit module 102 may be configured to couple to a printed circuit board 112 for incorporation into the computing device. The wireless integrated circuit module 112 may reside within a designated portion of the enclosure such that it is isolated from other components (as illustrated), or alternatively, may be housed with other components, for example in a common compartment. The wireless integrated circuit module 102 may be coupled to the PCB 112 via one or more fasteners 108. A fastener, as used herein, is any device capable of attaching one component to another. Various fasteners may include screws, pins, clips, latches, or other devices. The fasteners 108 may comprise conducting materials. In the illustrated example, the fastener 108 is a screw configured to mate with a corresponding eyelet on the PCB 112.

The system may also include an RF interference shield 106A-B coupled to the printed circuit board 112 via the fastener 108. The RF interference shield 106A-B is to cover the one or more RF connectors 104A-B to intercept and ground interference. An RF interference shield 106A-B, as used herein, is a component that shields one or more components from RF interference. The RF interference shield 106A-B may be disposed in a manner such that it covers the RF connectors 104A-B. Covering may be defined as overlaying at least one plane of the RF connector 104A-B. The RF interference shield 106A-B may comprise various materials, such as copper, steel, gold, silver or other conductors. The RF interference shield 106A-B may be coupled to a ground plane, such as chassis ground or battery ground, via the fastener or alternatively, coupled to ground via other means such as wires or traces. In various examples, the RF interference shield 106A-B comprises a predetermine shape such that the inductance and resistance of the RF interference shield are minimized at high frequency, while enabling received interference to be converted to current and transferred to ground.

Figure 2:
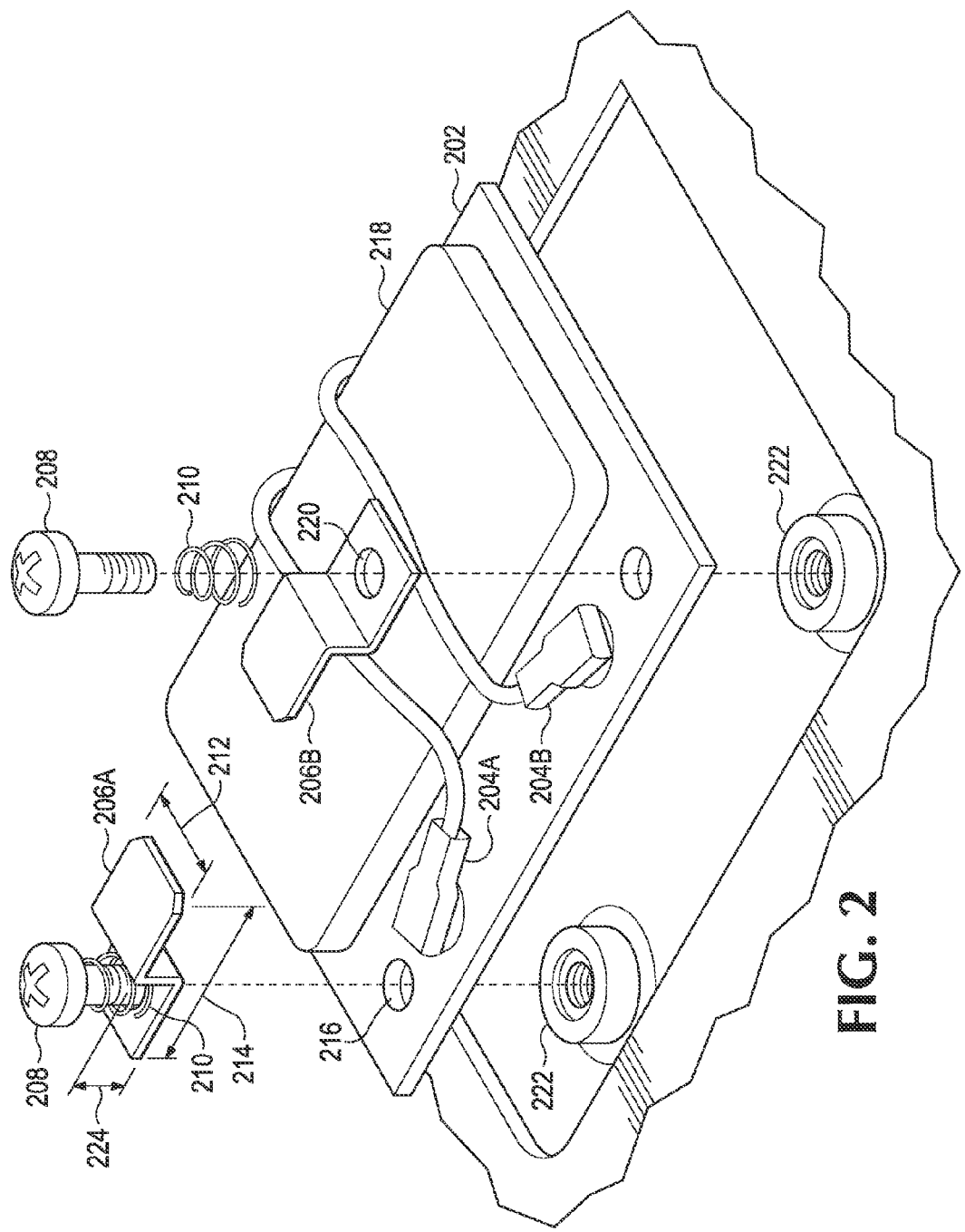
FIG. 2 illustrates an exploded view of another system in accordance with an example of the present disclosure.

In one example, the RF interference shields 106A-B may include a length and width having a radio of less than three to 1 (3:1) (illustrated more clearly in FIG. 2). This predetermined ratio facilitates low resistance and low inductance when intercepting and transferring high frequency signals to ground. In addition the RF interference shields 106A-B may have a contact resistance of less than approximately ten mili-ohms, and may be applied to the RF connectors 104A-B with a contact force of approximately one hundred grams or more. The RF interference shields 106A-B may be configured to reduce received interference within eighteen or nineteen Mega-Hertz frequency bands. The RF interference shields 106A-B may be held in place via the same fasteners 108 utilized to secure the wireless integrated circuit module 102 to the PCB 112, and may utilize the fasteners 108 to apply the contact force.

Referring to FIG. 2, an exploded view of another system is illustrated in accordance with an example of the present disclosure. FIG. 2 illustrates a wireless integrated circuit module 202 comprising an RF connector 204A-B to couple an integrated circuit 218 of the wireless integrated circuit module 202 to an external antenna, a fastener eyelet 216 disposed adjacent to the RF connector 204A, and an RF interference shield 206A-B that may be coupled to the fastener eyelet 216 and extending over the RF connector 204A-B.

The RF connector 204A-B may again be one of multiple connectors previously mentioned and may be either the male or female side. In addition, the RF connector 204A-B may be configured to couple the wireless integrated circuit module 202 to an external antenna (not illustrated). The antenna may be a main antenna or an auxiliary antenna. Once coupled to the antenna, the wireless integrated circuit module 202 may be capable of communicating over one or more wireless mediums.

The fastener eyelet 216 may be a threaded through-hole configured to enable the wireless integrated circuit module 202 to couple to the computing device. In other examples the fastener eyelet 216 may not be threaded. The fastener eyelet 216 may be disposed adjacent to the RF connector 204A-B and may receive a fastener 208 to couple to the wireless integrated circuit module 202 to the computing device. The fastener eyelet 216 may comprise a material configured to facilitate transmission of signals to a ground plane, for example chassis ground.

When inserted into a computing device, a fastener 208 may be placed through the fastener eyelet 216. The fastener 208 may include an RF interference shield 206A-B or may be inserted through a corresponding eyelet 220 within the RF interference shield 206B such that the RF interference shield 206B is similarly coupled to the computing device. When fully integrated, the RF interference shield 206A-B may come into contact with the RF connector 204A-B. The contact may comprise a predetermined amount of contact force that is determined based upon, for example, an amount of advancement the fastener 208 is enabled to penetrate into the computing device via threads 222. In various other examples, the fastener 208 may include a biasing member 210. The biasing member 210 may be an element configured to add an additional amount of contact force. For example, a biasing member 210 may include a spring coaxial with the fastener 208 and configured to apply a force on the RF interference shield 206A.

The RF interference shield 206A-B may comprise a predetermined length 214, a predetermined width 212, and/or a predetermined height 224. The length 214, width 212, and height 224 may be predetermined to reduce a noise signal within a frequency band. In one example, the predetermined length 214 and the predetermined width 212 have a ratio of three to one (3:1). The 3:1 ratio, in various examples, may help attenuate or reduce the presence RF interference.

In various examples, the RF interference may be generated by the wireless integrated circuit module 202. For example, the integrated circuit 218 of the wireless integrated circuit module 202 may include an oscillator (not illustrated). The oscillator may generate harmonics within various frequency bands utilized by other components, for example the WWAN components. In other examples, the RF interference may be generated by a device independent of the wireless integrated circuit module 202.

Figure 3:
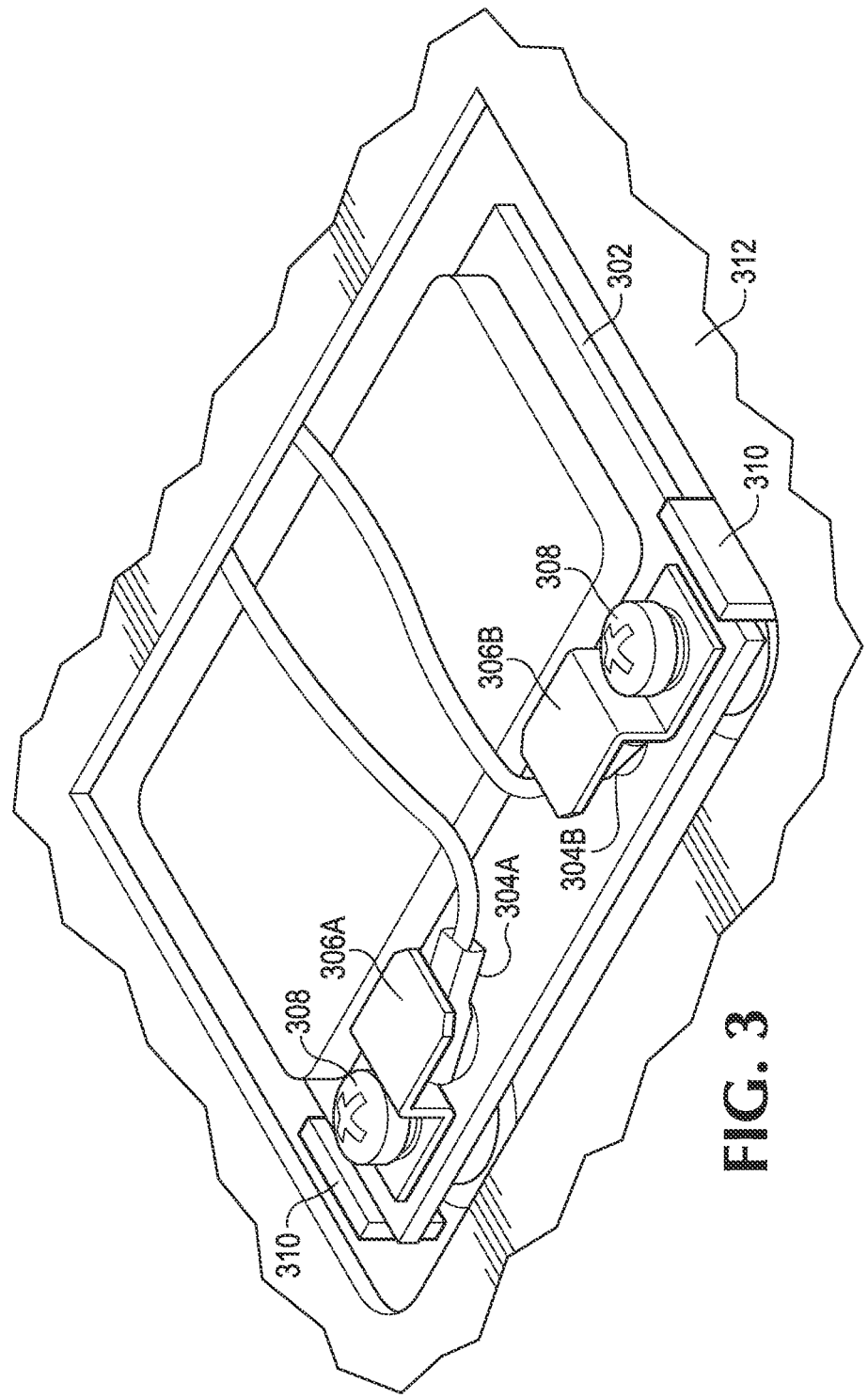
FIG. 3 illustrates another example of a system in accordance with an example of the present disclosure.

Referring to FIG. 3, another example of a system is illustrated in accordance with an example of the present disclosure. The system of FIG. 3 includes components generally similar to those discussed with reference to FIGS. 1 and 2. The system includes a wireless integrated circuit module 302, an RF connector 304A-B, an RF interference shield 306A-B, and one or more fasteners 308.

The wireless integrated circuit module 302 includes the RF connectors 304A-B and is coupled to a computing device via fasteners 308 which are disposed adjacent to the RF connectors 304A-B. In addition, RF interference shields 306A-B are utilized to cover the one or more RF connectors 306A-B and intercept and ground interference produced via the wireless integrated circuit module 302 or other components. The RF interference shields 306A-B may comprise a predetermined width and a predetermined length to reduce a noise signal within a predetermined frequency band.

The system, as illustrated in FIG. 3, may include additional components which may be utilized in conjunction with the wireless integrated circuit module. For example, a gasket 310 may be disposed between the RF interference shield 306A-B and an enclosure 312 housing the wireless integrated circuit module 302. A gasket, as used herein is a shaped material that may be placed between the enclosure of the wireless integrated circuit module and the fastener. In various examples, the gaskets 310 may provide a contact resistance with the RF interference shield 306A-B of less than approximately twenty Mili-ohm. This may increase the effectiveness of the RF interference shielding in various examples. The gaskets 310 may reduce the received interference and enable a more secure and steady contact force between the RF interference shield 306A-B and the RF connector 304A-B. In various examples, the gaskets 310 may comprise materials such as conductive foam, plastics integrated with conductive wiring, gels, or other materials. The gaskets may comprise varying shapes and may be disposed along a periphery of the wireless integrated circuit module.

Figure 4:
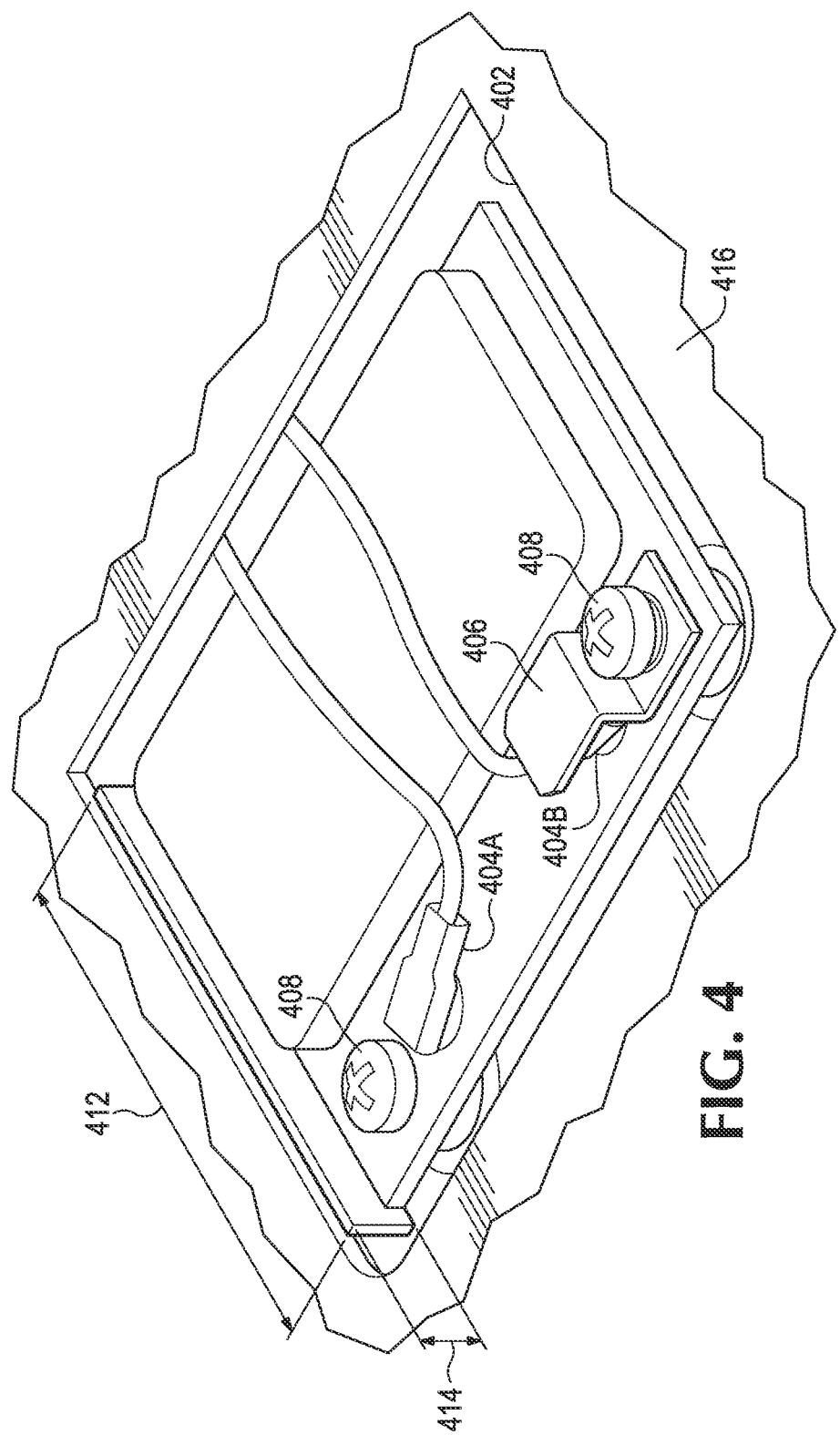
FIG. 4 illustrates another example of a system in accordance with an example of the present disclosure.

Referring to FIG. 4, another example of a system is illustrated in accordance with the present disclosure. The system of FIG. 4 includes components generally similar to those discussed with reference to FIGS. 1-3. The system includes a wireless integrated circuit module 402, an RF connector 404A-B, an RF interference shield 406, and one or more fasteners 408.

The wireless integrated circuit module 402 includes the RF connectors 404A-B and is coupled to a computing device via fasteners 408 which are disposed adjacent to the RF connectors 404A-B. In addition, RF interference shield 406 is utilized to cover one RF connector 404B and intercept and ground interference produced via the wireless integrated circuit module 402 or other components. The RF interference shield 406 may comprise a predetermined length and a predetermined width to reduce a noise signal within a predetermined frequency band.

In the illustrated example, the system also includes conductive material 410. Conductive material, as used herein may include various conductive materials that may be disposed on various sides of the enclosures including for example conductive tapes and paints. The conductive material 410, in various examples, may have various dimensions determined to facilitate effective RF interference shielding. In one example, the conductive material 410 may have a length 412 of approximately twenty millimeters and a width 414 of 4 millimeters. Other dimensions are contemplated and may depend for example on the dimensions of the enclosure 416.

While various components have been illustrated in independent figures, for example gaskets 310 of FIG. 3 and conductive material 410 of FIG. 4, it is contemplated that various combinations of components as discussed herein may be utilized in various combinations to reduce RF interference associated with various components.

Figure 5:
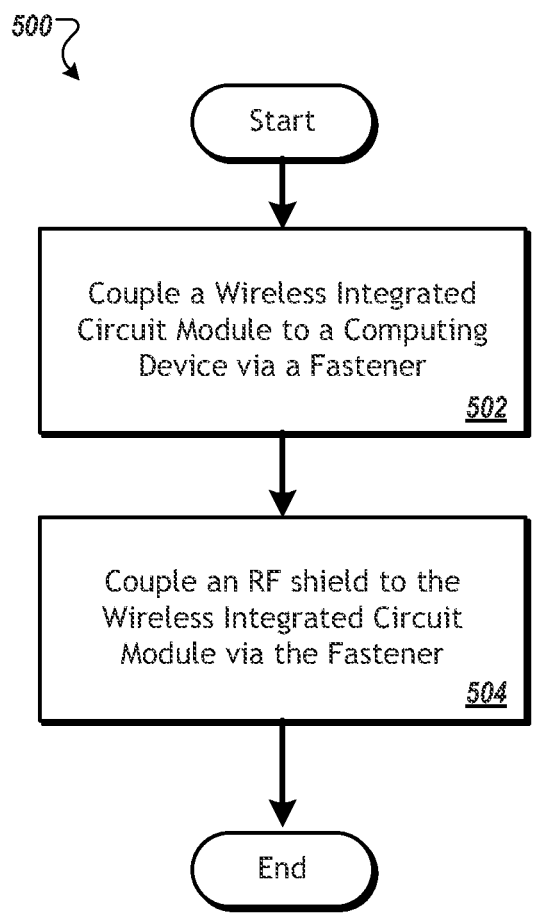
FIGS. 5-6 illustrate flow diagrams in accordance with examples of the present disclosure.
Figure 6:
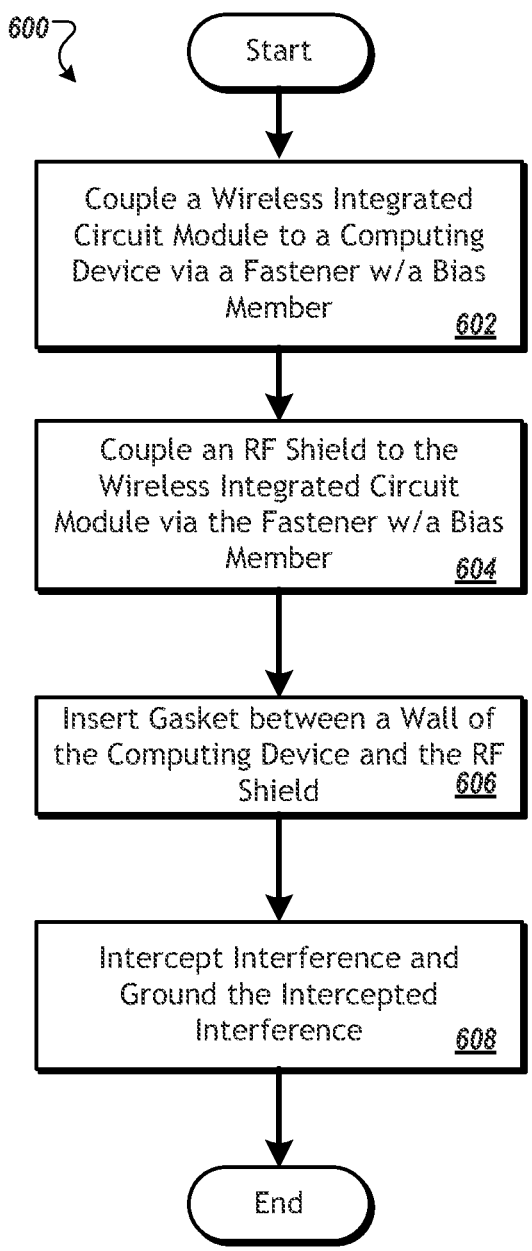

Referring to FIGS. 5-6, flow diagrams are illustrated in accordance with various examples of the present disclosure. The flow diagrams are included merely for illustration and while they depict various steps in a particular manner, they should not be construed to require all elements in all embodiments, or that the elements occur in a particular order.

Referring to FIG. 5, the flow diagram may begin (at 502) by coupling a wireless integrated circuit module to a computing device via a fastener, wherein the wireless integrated circuit module includes a radio frequency connector to couple the wireless integrated circuit module to an external antenna. The wireless integrated circuit module may be a wireless integrated circuit module as described with reference to FIGS. 1-4. In various examples the wireless integrated circuit module may be coupled to the computing device utilizing a conductive screw which acts as a conduit for transferring received interference to ground.

In addition to coupling the wireless integrated circuit module to the computing device via a fastener, an RF interference shield may be coupled to the wireless integrated circuit module via the fastener (at 504), wherein the RF interference shield extends over the RF connector to intercept and ground interference. The RF interference shield may be an RF interference shield as described with reference to FIGS. 1-4. In various other examples, a fastener other than the fastener utilized to couple the wireless integrated circuit module may be utilized to secure the RF interference shield to the RF connector.

Referring to FIG. 6, another flow diagram of a process is illustrated in accordance with an example of the present example. The flow diagram may begin (at 602) by coupling a wireless integrated circuit module to a computing device via a fastener incorporating a biasing member. The wireless integrated circuit module may be similar to the wireless integrated circuit module discussed with reference to FIGS. 1-4, and may include an RF connector to couple the wireless integrated circuit module to an external antenna.

In addition to coupling the wireless integrated circuit module to the computing device, an RF interference shield may be coupled to the wireless integrated circuit module (at 604) via the fastener incorporating the bias member. In various examples, the biasing member may apply a predetermined contact force to the RF interference shield such that it contacts the RF connector.

In various examples, before or after incorporation of the wireless integrated circuit and RF interference shield via the fastener, a gasket may be placed between the wall of the computing device and the RF interference shield (at 606). The gasket in various examples may be a conductive foam gasket having less than approximately three hundredths ohms/square inch in both horizontal and vertical directions. In addition, the gasket may weight approximately five hundred grams.

In an assembled condition, the RF interference shield may begin to intercept interference generated via a component and ground the intercepted interference (at 608). In various examples, the interference may be generated by the wireless integrated circuit module or the another device. The interference may be associated with a twenty megahertz signal generated by an oscillator.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:

1. A computing device, comprising:
    a wireless integrated circuit module comprising one or more radio frequency (RF) connectors;
    a fastener to couple the wireless integrated circuit module to a printed circuit board (PCB) of the computing device; and
    an RF interference shield coupled to printed circuit board via the fastener, wherein the RF interference shield is to cover the one or more RF connectors to intercept and ground interference.

2. The computing device of claim 1, wherein the RF interference shield comprises a contact resistance of less than approximately 10 Mili-ohms.

3. The computing device of claim 1, wherein the RF interference shield comprises a length to width ratio of approximately 3 to 1.

4. The computing device of claim 1, further comprising:
    a bias member to bias the RF interference shield against the one or more RF connectors.

5. The computing device of claim 1, further comprising:
    a conductive material adhered to at least one side of an enclosure housing the wireless integrated circuit module.

6. The computing device of claim 1, further comprising:
    a gasket disposed between the RF interference shield and an enclosure housing the wireless integrated circuit module, wherein the gasket is to reduce the received interference.

7. The computing device of claim 1, wherein the RF interference shields are to reduce received interference within the 1800 MHz or 1900 MHz band.

8. The computing device of claim 1, wherein the RF interference shield is coupled to a ground plane within the PCB via the fastener.

9. A wireless integrated circuit module, comprising:
a radio frequency (RF) connector to couple an integrated circuit of the wireless integrated circuit module to an external antenna;
a fastener eyelet disposed adjacent to the RF connector wherein the fastener eyelet is to receive a fastener to couple the wireless integrated circuit module to a device; and
an RF interference shield coupled to the fastener eyelet via the fastener and extending over the RF connector, wherein the RF interference shield comprises a predetermined length and a predetermined width to reduce a noise signal within a predetermined frequency band.

10. The wireless integrated circuit module of claim 9, wherein the predetermined length and the predetermined width have a ratio of 3 to 1.

11. The wireless integrated circuit module of claim 9, wherein the noise signal is generated by an electronic device independent of the wireless integrated circuit module.

12. The wireless integrated circuit module of claim 11, wherein the electronic device is a 20 MHz oscillator.

13. The wireless integrated circuit module of claim 9, wherein the fastener further comprises, a bias configured to force the RF interference shield into contact with the RF connector with a predetermined amount of force.

14. The wireless integrated circuit module of claim 13, wherein the predetermined amount of force is at least 100 grams.

15. The wireless integrated circuit module of claim 9, wherein the RF interference shield is coupled to a ground plane via the fastener.

16. The wireless integrated circuit module of claim 9, further comprising:
a gasket disposed between the RF interference shield and an enclosure of the wireless integrated circuit module, the gasket to further reduce the noise signal.

17. A method, comprising:
coupling a wireless integrated circuit module to a computing device via a fastener, wherein the wireless integrated circuit module includes a radio frequency (RF) connector to couple the wireless integrated circuit module to an external antenna; and
coupling an RF interference shield to the wireless integrated circuit module via the fastener, wherein the RF interference shield extends over the RF connector to intercept and ground interference.

18. The method of claim 17, wherein coupling the RF interference shield to the wireless integrated circuit module comprises utilizing a incorporating a bias member with the fastener, wherein the bias member is to apply a force to the RF interference shield.

19. The method of claim 17, further comprising:
inserting a gasket between a wall of the computing device and the RF interference shield.

20. The method of claim 17, further comprising:
intercepting interference generated via a twenty megahertz signal; and
grounding the intercepted interference.

* * * * *

UNITED STATES PATENT AND TRADEMARK OFFICE
CERTIFICATE OF CORRECTION

| | | |
|---|---|---|
| PATENT NO. | : 9,054,779 B2 | Page 1 of 1 |
| APPLICATION NO. | : 13/616712 | |
| DATED | : June 9, 2015 | |
| INVENTOR(S) | : Chang-Cheng Hsieh et al. | |

It is certified that error appears in the above-identified patent and that said Letters Patent is hereby corrected as shown below:

On the title page, item (74), Attorney, in column 2, line 2, delete "Development" and insert
-- Department --, therefor.

Signed and Sealed this
Eighth Day of December, 2015

Michelle K. Lee
*Director of the United States Patent and Trademark Office*